Figure 1:
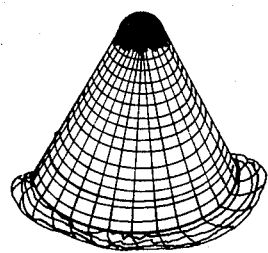

United States Patent [19]
Weedon et al.

[11] 3,762,564
[45] Oct. 2, 1973

[54] FILTER AND METHOD OF MANUFACTURE

[75] Inventors: Gene Clyde Weedon, Richmond, Va.; George Howard Collingwood, Rolling Fork, Miss.; Robert Charles Wincklhofer, Richmond, Va.

[73] Assignee: Allied Chemical Corporation, New York, N.Y.

[22] Filed: May 11, 1972

[21] Appl. No.: 252,233

Related U.S. Application Data

[63] Continuation-in-part of Ser. Nos. 825,575, May 19, 1969, abandoned, and Ser. No. 825,576, May 19, 1969, abandoned.

[52] U.S. Cl................ 210/446, 210/497, 210/499, 210/505
[51] Int. Cl............................................ B01d 35/02
[58] Field of Search................. 210/499, 490, 491, 210/506, 507, 508, 497, 446, 505; 161/175, 170, 150

[56] References Cited
UNITED STATES PATENTS

| 2,732,946 | 1/1956 | Schaub | 210/497 X |
| 3,099,067 | 7/1963 | Merriam | 161/DIG. 5 |
| 3,382,305 | 5/1968 | Breen | 161/DIG. 5 |
| 3,038,235 | 6/1962 | Zimmerman | 161/175 X |
| 3,500,991 | 3/1970 | Vogt | 210/496 X |

FOREIGN PATENTS OR APPLICATIONS

| 930,074 | 7/1963 | Great Britain | 161/DIG. 5 |
| 1,043,762 | 9/1966 | Great Britain | 161/DIG. 5 |
| 1,076,175 | 7/1963 | Great Britain | 161/DIG. 5 |
| 1,310,150 | 10/1962 | France | 210/499 |

Primary Examiner—Samih N. Zaharna
Assistant Examiner—F. F. Calvetti
Attorney—Patrick L. Henry et al.

[57] ABSTRACT

Filters for petroleum based liquids and the like are manufactured from heat-treated fabric composed of multicomponent fibers. In general the filter is characterized by light weight, corrosion resistance, compatibility with petroleum based liquids, low cost, dimensional stability and resistance to shock and other mechanical abuse.

13 Claims, 2 Drawing Figures

PATENTED OCT 2 1973

3,762,564

FILTER AND METHOD OF MANUFACTURE

BACKGROUND OF THE INVENTION

CROSS REFERENCE TO RELATED APPLICATIONS

This application is a continuation-in-part of our co-pending U.S. Pat. application Ser. No. 825,575, filed May 19, 1969, now abandoned and co-pending U.S. Pat. application Ser. No. 825,576, now abandoned filed May 19, 1969.

FIELD OF THE INVENTION

The present invention relates to a filter and the method for making it through the use of multi-component fibers which are formed into a fabric and subsequently heated to cause a self-bonding of the fibers and to place them in a state that they can plastically be formed into the desired shape of the filter. The multi-component fibrous material may be comprised of: 1) "co-extruded fibers," i.e., fibrous material comprised of at least two different fiber-forming polymeric materials joined together in individual filaments by concurrent extrusion in individual composite relationship; 2) "mechanically blended fibers," i.e., fibrous material comprised of at least two different fiber-forming polymeric materials which have been mechanically blended, either as continuous filaments, staple fibers, or a combination of the two; and/or 3) "matrix fibers," i.e., multi-constituent fibrous material having a polymeric matrix containing a dispersion of discontinuous micro-fibers or fibrils of a different polymer with a substantially higher melting point than the polymer matrix in which they are present.

DESCRIPTION OF THE PRIOR ART

Filters are widely used in industry and commerce and in the home for a variety of duties to separate large solid particles from a fluid flowing through the filters. Heretofore, these filters have been especially valuable for separating solid particles from petroleum products such as gasoline and the like. A large number of these filters have been formed from woven metal wires which are shaped in a cup-like fashion and have a solid metal peripheral flange fastened thereto. Filters have been formed of a variety of materials in a variety of shapes and pore sizes, depending on the desired application.

The art is familiar with co-extruded fibers made from different material extruded together in side-by-side relationship or in sheath-core relationship as shown, for example, in U.S. Pat. Nos. 3,117,362 and 3,116,589. Likewise, matrix fibers are also known; exemplary of these are those shown in Twilley's U.S. Pat. No. 3,369,057, which patent is hereby incorporated by reference as if fully set out herein. Additionally, mechanically blended fibers have been well known in the art for many years.

In U.S. Pat. application Ser. No. 727,326, filed May 7, 1968, now abandoned, fabrics are produced using co-extruded fibers which are capable of adhering to each other during filament formation and thereafter during heat-treatment. It was also disclosed that fabric made from such co-extruded fibers could be heated under appropriate conditions to produce novel fabrics having improved physical properties.

SUMMARY OF INVENTION

In accordance with the present invention, unique new filters are formed of fibers with widespread useful value, especially when used with petroleum products. These multicomponent filamentary materials include co-extruded fibers, mechanically blended fibers and matrix fibers, all having the common characteristic of being capable of fusion at their interstices via bonding of the lower melting component while the higher melting component provides a backbone to prevent significant flow or cross-flattening or disfiguration at the bonding point. It is also an inherent characteristic of these multi-component filamentary materials that the similar low melting components of adjacent fibers in a textile material will substantially always come into contact with one another at the fiber interstices to provide uniform bonding such that no particular weaving operation or forming operation is necessary to provide the necessary joining of the lower melting materials. Thus, an important feature of this invention is that multi-component fiber relationship is intentionally created and preserved throughout the heat setting phases of filter production to provide controllable porosity with improved strength and other advantages hereinafter discussed. It was discovered that various systems of blended polymers having at least two polymers or fibers of varying melt temperatures can be employed to produce filters of controllable porosity and stabilized shape. In general this invention provides filters and methods of producing the same in a variety of shapes and pore sizes compatible with a variety of fluids.

DESCRIPTION OF THE INVENTION

As used herein, the following terms are intended to have the following meanings:

Multi-component fibers — fibers having at least two dissimilar components having substantially different melt temperatures such that fibrous constructions composed thereof can be heat-set by application of heat below the melt temperature of one and equal to or above that of the other, including co-extruded fibers, mechanically blended fibers and matrix fibers.

Co-extruded fibers — fibers made from at least two different fiber-forming polymeric materials joined together in individual filaments by concurrent extrusion in individual composite relationship, the two materials having substantially different melt temperatures such that fibrous constructions composed thereof can be heat-set by application of heat below the melt temperature of one and equal to or above that of the other, the entire filament composition or any component thereof optionally including any secondary material compatible with the heat-set property of the fabric as a whole such as antioxidants and other stabilizing agents, reinforcing particles, fillers, adhesion promoting agents, fluorescent materials, dispersing agents, and others useful in polymerization, extruding, spinning, fabric forming and shaping, heat-setting and product finishing techniques. If desired, inorganic materials such as metal whiskers, fiber glass fibrils, asbestos particles and the like may be incorporated for conductive and/or reinforcement purposes.

Mechanically blended fibers — fibers prepared by mechanically blending different staple fibers having substantially different melt temperatures or by plying together continuous filaments prepared from polymeric materials having substantially different melt temperatures. Preferably, the fiber having the higher melt temperature should comprise at least 50 percent of the yarn to prevent undesirable flow of the lower melting fiber when heated above the melt temperature of said lower melting fiber. The construction of these mechanically blended fibers is such that fibrous construction composed thereof can be heat-set by application of heat below the melt temperature of one and equal to or above that of the other, the entire filament composition or any component thereof optionally including any secondary material compatible with the heat-set property of the fabric as a whole such as antioxidants oxidants and other stabilizing agents, reinforcing particles, fillers, adhesion promoting agents, fluorescent materials, dispersing agents, and others useful in polymerization, extruding, spinning, fabric forming and shaping, heat-setting and product finishing techniques. If desired, inorganic materials such as metal whiskers, fiber glass fibrils, asbestos particles and the like may be incorporated for conductive and/or reinforcement purposes.

Matrix fibers — fibers made by inclusion of at least one polymeric material in a matrix of another as discontinuous fibrils, the two materials having substantially different melt temperatures such that fibrous constructions composed thereof can be heat-set by application of heat below the melt temperature of one and equal to or above that of the other, the entire filament composition or any component thereof optionally including any secondary material compatible with the heat-set property of the fabric as a whole such as antioxidants and other stabilizing agents, reinforcing particles, fillers, adhesion promoting agents, fluorescent materials, dispersing agents, and others useful in polymerization, extruding, spinning, fabric forming and shaping, heat-setting and product finishing techniques. If desired, inorganic materials such as metal whiskers, fiber glass fibrils, asbestos particles and the like may be incorporated for conductive and/or reinforcement purposes.

Textile material — any woven, knitted or non-woven fibrous structure.

Suitable materials useful in the multi-component fibers for purposes of this invention are any fiber-forming thermoplastic polymer materials such as polyamides, polyolefins, polyesters, polycarbonates, polysulfones, and polyphenylene oxides, for example. Where sheath-core filaments are employed, the sheath should be the lower melting component to assure proper stiffening by application of heat. In either case the higher melting single entity or blended component is sufficiently resistant to heat and has sufficient affinity for the lower melting component that flow or substantial deformation of the latter is retarded or prevented; and coupled with the heat-treating conditions employed which are relatively short time periods sufficient to achieve stiffening but normally at or only slightly above the melt temperature of the lower melting component, original shape and size integrity of the filaments is maintained.

Preferably, the multi-component yarns are comprised of a discrete polymer or copolymer forming an individual component; however, one or more of the components may be a matrix-type component spun from a polymer blend such as disclosed in U.S. Pat. No. 3,369,057. For example, a matrix-type component would be spun in a side-by-side relationship with another polymer composition, preferably a composition similar to the matrix-forming composition so better fusion of the components will be achieved.

As an example of a sheath-core yarn, nylong 6 can be used as a sheath material and nylon 6,6 as a core in equal amounts by weight in a jersey circular knitted fabric of the type described above, heated at a temperature of between 230° C. to 260° C. being the optimum. The results with the sheath-core will not be as good as with the side-by-side multi-component, but improved properties can be achieved over filters of the prior art.

For any given multi-component formulation, the temperature and time will vary for increasing stiffness, depending on the polymeric materials involved, article size, shape, fabric construction, i.e., woven, non-woven, knitted, loose, tight, etc., insured rigidity, mode of heat application and other variables. In general, it is necessary to apply heat without excessive degradation and of sufficient intensity and duration at least as high as the melting point of the lower melting component. Thus, no empirical or mathematical formula has been found for determining the minimum or maximum heating conditions to effect the multi-component yarns, appearance and degree of stiffness after heating being the most important criteria. Where the polymeric components or other filamentary material employed have substantial differences in shrinkage or other deforming characteristics under the heat-treating conditions, it is necessary to restrain the material or otherwise counteract these differences by conventional means.

In one embodiment of the invention a filter is made from fabric or textile material prepared from matrix fibers or yarn of any combination of polymeric materials capable of creating a matrix and having a relatively higher melting dispersion of discontinuous fibrils; however, it is clear that a polyester-polyamide combination produces outstanding articles over the other materials. These compositions may contain 50–90 parts by weight nylon and 50–10 parts by weight polyester dispersion. Other materials useful in matrix fibers are polyolefins, polysulfones, polyphenyl oxides, polycarbonates, and other polyamides and polyesters. In any combination of any of the foregoing, the higher melting material is dispersed in the form of fibrils in a matrix of the other. In all of the blends mentioned hereinafter, heatsetting and improved shape stability was achieved. Examples of the most useful polyolefin materials are polyethylene, polypropylene, poly-1-butene, poly-2-butene, polyisobutylene and polystyrene. In addition to the preferred nylon 6 (polycaproamide), other suitable polyamides are nylon 6–10 (polyhexamethylene-diamine-sebacic acid), nylon 6—6 (polyhexamethylene-diamine-adipic acid), methanol- and ethanol- soluble polyamide copolymers and other substituted polyamides such as the alkoxy-substituted polyamides. The preferred polyester is polyethylene terephthalate; others are polyesters of high $T_G$ useful in the practice of the present invention, including those polymers in which one of the recurring units in the polyester chain is the diacyl aromatic radical from terephthalic acid, isophthalic acid, 5-t-butylisophthalate, a naphthalene dicarboxylic acid such as napthalene 2,6 and 2,7 acids, a diphenyldicarboxylic acid, a diphenyl ether dicarboxylic acid, a diphenyl alkylene dicarboxylic acid, a diphenyl sulphone dicarboxylic acid, an azo dibenzoid acid, a pyridine dicarboxylic acid, a quinoline dicarboxylic acid, and analogous armoatic species including the sulfonic acid analogues; diacyl radicals containing cyclopentane or cyclohexane rings between the acyl groups; and such radicals substituted in the ring, i.e., by alkyl or halo substituents.

In addition, still other blends are satisfactory for purposes of this invention, including those disclosed in U.S. Pat. Nos. 3,378,055; 3,378,056 and 3,378,602; British Pat. No. 1,097,068; Belgian Pat. No. 702,813; and Dutch Pat. No. 66,06838.

As indicated, for a 70/30 nylon-polyester combination, the optimum fusion temperature is approximately 240° C. for efficient fushion, fiber integrity retention and coloration. Naturally the time for fusion is dependent on many factors, including the filament or yarn size, fabric construction, i.e., knit, weave, loose, tight, etc., and the shape of the filter desired from the fusion and forming process. Thus, time periods are determined by the mass to be heated and the type of heat source employed. For example, when employing an oven, durations as short as 15–20 seconds at 240° C. have been found effective for at least partial fusion. Fusion times of up to 300 seconds and longer at 250° C. have been tested for Fabric A, and although fusion was achieved, the breaking strength of the microfibrillar polyester formed fabric filter was reduced somewhat. A gradual increase in fabric strength occurs after an initial drop at 30–60 seconds at 240° C., and the strength level of the fabric fused at 240° C. for times greater than 60 seconds is higher than 230° C. and 250° C. fused samples. It is theorized that this phenomenon is achieved by additional crystillization of the polyester component at about 240° C.

To summarize, for 70 denier nylon-polyester matrix yarn, 30 to 60 seconds in a dry oven at 240° C. appears to be the optimum fusion conditions.

Filter properties after processing are tested especially at certain temperatures and time periods; however, any deleterious effects may be offset or substantially reduced by incorporation of any appropriate additive in the matrix blend. Examples of the most significant additives mentioned above in the definition of matrix fibers are Irganox 565 to reduce discoloration and slight strength improvement and Santowhite powder which increases strength retention by approximately 50 percent in some blends. Santowhite powder and Irganox 565 also improve color after fusion.

EXAMPLE 1

As a first example of the practice of the invention, a matrix fiber is produced in accordance with the formulation of Example 1 in U.S. Pat. No. 3,369,057, i.e., granular polyethylene terephthalate polymer was used, melting about 255° C. (DTA) and about 265° C. (optical), having density (when amorphous) of about 1.33 grams per cc. at 23° C. and about 1.38 grams per cc. in the form of drawn filament, having reduced viscosity of about 0.85 and having $T_G$ about 65° C. the polyester in the form of drawn filament drawn to give ultimate elongation not above 20 percent will have tensile modulus (modulus of elasticity) ranging from about 70 to about 140 grams per denier, depending on spinning conditions employed.

This polyester (30 parts) was mixed with 70 parts of granular polycaproamide having reduced visocity about 1.04, $T_G$ about 35° C. and density about 1.14 grams per cc. at 23° C. Amine groups in this polycaproamide had been blocked by reaction with sebacic acid, bringing the amine group analyses thereof to 11 milliequivalents of $NH_2$ groups per kilogram of polymer. This polycaproamide contained as heat stabilizer 50 ppm copper as cupric acetate.

The mixture of polyamide and polyester granules was blended in a double cone blender for 1 hour. The granular blend was dried to a moisture content of no more than 0.01 percent; then melted at 285° C. in a 3-½ inch diameter screw extruder operated at a rotational speed of about 39 rpm to produce a pressure of 3,000 psig at the outlet. A dry nitrogen atmosphere was used to protect the blend against absorbing moisture. Residence time in the extruder was 8 minutes.

The molten mixture thereby obtained had melt viscosity of about 2,000 poises at 285° C. The polyester was uniformly distributed throughout and had average particle diameter of about 2 microns, as observed by cooling and solidifying a sample of the melt, leaching out the polyamide component with formic acid, and examining the residual polyester material.

The multi-constituent blend thus produced was extruded through a spinneret plate and the resulting fibers were drawn and wound, the final yarn denier being 70 grams per 9,000 meters. Two ends of this yarn were plied together resulting in a 140 denier yarn. Each of the original yarns was comprised of 16 filaments each; the final plied yarn had 32 filaments. The plied yarn was then texturized or crimped using conventional techniques, and fashioned into a Swiss pique circular knit fabric using conventional knitting equipment (hereinafter referred to as Fabric A). The weight of the fabric was 5 ounces per square yard. Next, a 60° stainless steel cone 4 inches in height and 4 inches in diameter across the base and a larger radius of curvature at the tip, and a 60° Pyrex glass cone 3-½ inches in both height and base diameter were heated in a forced draft oven. When the oven had maintained the pre-selected temperature for 10 minutes, the oven door was opened quickly and the fabric was rapidly positioned above the top of the metal cone. The glass cone was placed above the fabric and then quickly thrust downward by hand toward the metal cone. A 2,000 gram weight was positioned at the top or apex of the glass cone to maintain fabric-mold contact. The optimum balance between strength and other characteristics is obtained with application of heat in this manner at 240° C. for 30–60 seconds although satisfactory results were achieved within the range of 230°–250° C. over different time periods. The resulting conical filter similar to FIG. 1 was thereby produced which upon testing was found to be tough and rigid with a uniform pore size that was locked in place since all the filaments were self-bonded to one another at their point of intersection.

For comparative purposes, the above procedure was repeated in all respects except that the fiber-forming material was 100 percent nylon 6 (Fabric B), a 210 denier–14 filament 100 percent nylon 6 untexturized yarn in a two-rib by two-rib knitted fabric of 5 ounces per square yard (Fabric C), and 210 denier-14 filament 100 percent polyethylene terephthalate (Fabric D).

Fabrics B and C, 100 percent nylon 6, could not be molded into a rigid conical shape. At 230° C. both fabrics started melting within 60 seconds; at 225° C. within 60–90 seconds; and at 220° C. within 180 seconds. At 215° C. no noticeable change in stiffness was noted although the fabric was deformed into a conical shape. Fabric D, 100 percent polyethylene terephthalate, could be molded into a rigid shape at 250° C.; however, this material was much less durable.

Conical filters of fused, molded Fabrics A and D were subjected to mechanical abuse testing in order to determine the degree of durability of the molded fabric. A cylindrical fiber board drum (13 inches in diameter and 19 inches in height attached at the lengthwise or height midpoint of the cylinder to a variable speed motor) was used to contain the filter. Several mechanical abraders-abusers were then tested for their effect on the filter.

EXAMPLE 2

Small highly elastic rubber balls (six each) and 10 molded conical filters of Fabric A fused at 230°–250° C. for various times from 15 seconds to 180 seconds were tumbled for 24 hours at 40 rpm in the drum. This treatment produced no discernible change in the shape nor outward appearance of Fabric A.

EXAMPLE 3

Example 2 was repeated except molded conical filters of Fabric D were used. Cones molded at 230° C. were very soft and pliable after 24 hours at 40 rpm with the rubber balls. Filters molded at 250° C. were softened but were capable of maintaining a generally conical shape if rested upon the base of the cone.

EXAMPLE 4

Example 2 was repeated except three sections of heavy rubber hose (three-eighths inch I.D.; seven-eighths inch O.D. total weight of 60 grams each) 8 inches in length were used in place of the rubber balls. The duration of the tumbling was 2 hours. Fabric A molded at 250° C. was totally unaffected by this treatment. Fabric A molded at times of 60 seconds or more at 230° C. was also unaffected. Fabric A molded for 30 seconds was slightly softened by this treatment.

EXAMPLE 5

Example 4 was repeated except conical filters molded from Fabric D were used. Fabric D molded conical filters were noticeably softened by the rubber hoses. At temperatures less than 250° C. and times of less than 60 seconds at 250° C., the cones lost all structural rigidity.

EXAMPLE 6

Example 4 was repeated except an additional 2 hours of tumbling with six stainless steel balls one-half inch in diameter were initiated after the 2 hours tumbling with the rubber hose. This treatment did not reduce to any noticeable degree the stiffness of the molded conical filters of Fabric A as observed after the previous rubber hose treatment. Slight abrasion or softening at the apex of the cones did occur, however, as a result of this treatment.

EXAMPLE 7

Example 6 was repeated except molded conical filters of Fabric D was molded at 250° C. were used. The cones molded at 90-150 seconds underwent a total loss in rigidity after the treatment described.

EXAMPLE 8

In order to further demonstrate the mechanical strength of the used, molded 70 percent nylon-30 percent polyester filters, the following example is cited: Three molded conical filters were prepared from Fabric A using molding times of 10, 15 and 30 seconds. One specimen of each molded cone was loaded tip-on with a static load of 1,200 grams. The cones werw subsequently crushed flat by applying the necessary hand pressure to completely flatten the cone. After 15 minutes under the static load, the weight was removed. The cones, all of which returned to their original shape, were then placed in hot water at 160°-170° F. for 30 minutes. After the samples were removed from the water, almost no residual wrinkles or creases could be observed in the cones.

EXAMPLE 9

As an example of a blend of two different materials in the same general class, a blend was prepared consisting of 30 percent polyethylene and 70 percent polypropylene by weight. Both resins were commercially available grades. The blend was spun using a 1-inch extruder having a 24 to 1 L/D ratio. The spinning temperatures were 280°–290° C. A 20-hole spinneret having a 0.020 mil diameter capillary with an L/D ratio of 10 to 1 and a 20° entrance angle was used. After spinning and drawing the filament was used to produce a fabric which was heat-set and formed into a conical filter in accordance with the principles outlined above except the temperature was below about 180° C.

EXAMPLE 10

Another example of practicing the invention, a matrix filament composed of 70 parts nylon matrix and 30 parts polyester fibrils dispersed therein was formed into a 140 denier 32 filament yarn. This yarn was then knitted on conventional knitting equipment into a fabric having approximately 44 courses per inch and 28 wales per inch. This was then shaped into a conical filter by loosely clamping the fabrics and forming between two matched dies at an oven temperature of 240° C. for sufficient time to permit the formation of the conical filter and permit sufficient fusion of the fabrics so that all of the interconnecting filaments and yarn would be self-bonded at the point of contact. The conical filter had a dept of three inches, a diameter of three inches, and was surrounded by a one-half inch flange such as shown in FIG. 1 of the drawings. It was found that because of the loose clamping of the original fabric, substantial slippage took place which accounted for the porosity of the filter not being greatly larger than that of the unfused and unformed fabric. The porosity of the formed filter was such that it was equivalent to 41 courses per inch and 24-¼ wales per inch with the largest pores being less than 1 millimeter in size. The filter was of substantially uniform porosity, semi-rigid, substantially crease resistant and impervious to gasoline and other petroleum products. The individual filaments in a single yarn are all bonded together giving a neat appearance and precluding any linting or other loose material from falling therefrom. Because of the consolidation of the individual filaments in the yarn and the stretching of the fabric during the forming, the pore size was larger than that of the unfused and unformed fabric but not greatly so, and it still maintained the substantially uniform size of the fabric from which it was made. The filter was strong and readily cleaned, and since no bonding agent was needed a superior porosity control and chemical control of the filter was provided.

EXAMPLE 11

The immediately preceding example was duplicated using a spacing in the knit fabric of 30 courses per inch and 20 wales per inch in order to provide a filter having increased porosity. The example was repeated for a third time but using the knit fabric having 55 courses per inch and 40 wales per inch. This provided a filter having less porosity than the other two.

EXAMPLE 12

In another embodiment of this invention, a bicomponent yarn was used, which is 40 percent nylon 6,6 as one component and 60 percent of a nylon copolymer of which 50 percent is nylon 6 and nylon 6,6 in equal amounts and the remaining 50 percent nylon 6,10. The components were spun from separate polymer melts in a side-by-side relationship and remained adhered together during quenching and subsequent processing.

A 140 denier bicomponent yarn prepared as described above was fashioned into a jersey circular knit fabric using conventional knitting equipment (hereinafter referred to as Fabric E). The weight of the fabric was 5 ounces per square yard. Next, a 60° stainless steel cone 4 inches in height and 4 inches in diameter across the base and a large radius of curvature at the tip, and a 60° Pyrex glass cone 3-½ inches in both height and base diameter were heated in a forced draft oven. When the oven had maintained the pre-selected temperature for 10 minutes, the oven door was opened quickly and the fabric was rapidly positioned above the top of the metal cone. The glass cone was placed above the fabric and then quickly thrust downward by hand toward the metal cone. A 2,000 gram weight was positioned at the top or apex of the glass cone to maintain fabric-mold contact. This optimum balance between strength and other characteristics is obtained with application of heat in this manner at 240° C. for 30–60 seconds although satisfactory results were achieved within the range of 230°–250° C. over different time periods. The resulting conical filter similar to FIG. 1 was thereby produced which upon testing was found to be tough and rigid with a uniform pore size that was locked in place since all the filaments were self-bonded to one another at their point of intersection.

EXAMPLE 13

Table I illustrates how non-woven filters prepared from mechanically blended staple filters can be prepared with differing properties by varying the blend level or the fusing conditions.

EXAMPLE 14

As another specific example of practicing the invention, a plied yarn was prepared using a 100 denier 32 filament nylon 6 yarn in combination with a 40 denier 27 filament polyester yarn. The plied yarn was then knitted on conventional knitting equipment into a fabric having 44 courses per inch and 28 wales per inch. This fabric was then shaped into a conical filter by loosely clamping the fabric between two matched dies at an oven temperature of 240° C. for sufficient time to permit the formation of the conical filter and permit sufficient fusion of the fabrics so that all of the interconnecting filaments and yarn would be self-bonded at the point of contact. The conical filter had a depth of 3 inches, a diameter of 3 inches, and was surrounded by a one-half inch flange such as shown in FIG. 1 of the drawings. It was found that because of the loose clamping of the original fabric, substantial slippage took place which accounted for the porosity of the filter not being greatly larger than that of the unfused and unformed fabric. The porosity of the formed filter was such that it was equivalent to 41 courses per inch and 24-½ wales per inch with the largest pores being less than 1 millimeter in size. The filter was of substantially uniform porosity, semi-rigid, substantially crease resistant and impervious to gasoline and other petroleum products. The individual filaments in a single yarn are all bonded together giving a neat appearance and precluding any linting or other loose material from falling therefrom. Because of the consolidation of the individual filaments in the yarn and the stretching of the fabric during the forming, the pore size was larger than that of the unfused and unformed fabric but not greatly so, and it still maintained the substantially uniform size of the fabric from which it was made. The filter was strong and readily cleaned, and since no bonding agent was needed a superior porosity conrol and chemical control of the filter was provided.

EXAMPLE 15

The immediately preceding example was duplicated using a spacing in the knit fabric of 30 courses per inch and 20 wales per inch in order to provide a filter having increased porosity. The example was repeated for a third time but using the knit fabric having 55 courses per inch and 40 wales per inch. This provided a filter having less porosity than the other two.

Several heating and forming systems may be used in making the filters, as for example, a forced air oven with a nitrogen purge, a static draft oven without nitro-

TABLE I.—PROPERTIES OF FUSIFORMED NON-WOVENS [1]

| Percent nylon 6 staple | Percent polyester staple | Weight oz./sq. yd. | Breaking strength, lbs./in. width | U.E., percent | Shrinkage, percent | Air retardance [2], cu. ft./30 min. | Molding conditions | | Tabor [3] abrasion |
|---|---|---|---|---|---|---|---|---|---|
| | | | | | | | Time, sec. | Pressure, p.s.i. | |
| 50 | 50 | 4 | 26 | 42 | 1.9 | 0.11 | | 0 | Excellent. |
| 50 | 50 | 6 | 38 | 42 | 1.6 | 0.11 | | 0 | Do. |
| 50 | 50 | 8 | 51 | 42 | 1.3 | 0.09 | | 0 | Do. |
| 50 | 50 | 9.3 | 63 | 41 | 1.0 | 0.18 | | 0 | Do. |
| 50 | 50 | 4 | 25 | 20 | 1.3 | 0.38 | | 165 | Do. |
| 50 | 50 | 6 | 42 | 24 | 1.0 | 0.26 | | 165 | Do. |
| 50 | 50 | 8 | 56 | 26 | 0.6 | 0.32 | | 165 | Do. |
| 50 | 50 | 9.3 | 72 | 27 | 0.6 | 1.16 | | 165 | Do. |
| 35 | 65 | 4 | 22 | 24 | 1.3 | 0.05 | | 0 | Failed at 111 cycles. |
| 35 | 65 | 6 | 43 | 28 | 1.0 | 0.05 | | 0 | Failed at 120 cycles. |
| 35 | 65 | 8 | 43 | 24 | 1.3 | 0.02 | | 0 | Failed at 308 cycles. |
| 35 | 65 | 4 | 39 | 28 | 1.0 | 0.06 | | 165 | Excellent. |
| 35 | 65 | 6 | 54 | 29 | 0.3 | 0.10 | | 165 | Do. |
| 35 | 65 | 8 | 80 | 31 | 0.3 | 0.17 | | 165 | Do. |

[1] Uniaxially carded batts, cross laminated 90°, 2 inch staple of 4.7 denier per filament crimped, exposure temperature of 240° C.
[2] One inch disc at 1.0 p.s.i. differential, retardance is difference between air flow with and without sample in line, initial flow without sample is 1.590 cu. ft./30 minutes.
[3] 1,000 cycles with CS-10 wheel and 500 gm. weight.

gen, heated match-die molds, a molding press, fluid thermoforming using a non-porous diaphragm, and a steam autoclave.

For any given multi-component formulation, the temperature and time will vary depending on the polymeric materials, filter size, shape, desired rigidity, mode of heat application and other variables. In general, it is necessary to apply heat without excessive degradation of sufficient intensity and duration at least as high as the melting point of the lower melting component until the fabric yarns have fused to each other yet still retain the desired porosity. If the fabric yarns are spun from staple fibers, the fibers forming said yarn will fuse together individually in addition to fusion at the cross points of said fabric. Fusion can be achieved without undesirable flow; it is this phenomenon which permits the present invention to provide unique dimensional stability and porosity and formability to textile materials and, therefore, regulates the minimum and maximum heat-set conditions. Thus, the fabric interstices are not closed by the fusion as described herein since there is no polymer flow or migration except that due to forming of the fabric into a non-planar shape.

The porosity of the fabric structures of this invention may be controlled by the types of yarns employed and conditions of treatment. For example, fabrics prepared from high shrinkage fibers and not restrained during heat treatment may be shrunk until the interstices thereof are practically closed whereby a microporous filter material is produced. Naturally, the time for fusion is dependent on many factors, including the filament or yarn size, fabric construction, i.e., knit, weave, loose, tight, etc., and the shape of the filter desired from the fusion and forming process. Thus, time periods are determined by the mass to be heated and the type of heat source employed. For example, when employing an oven, durations as short as 15–20 seconds at 240° C. have been found effective for at least partial fusion. Fusion times of up to 300 seconds and longer at 250° C. have been tested for fabrics A and E, and although fusion was achieved, the breaking strength of the fabric filter was reduced somewhat.

The fabric provided for making filters can vary greatly as to porosity, denier and other characteristics desired in the finished filter. The techniques for fusing and forming the fabric into the desired filter can be most of those used in traditional plastic sheet thermoforming, suitably modified to apply the correct temperature and able to withstand any shrinkage forces generated by the fabric during the fusing and forming steps.

Figure 2:
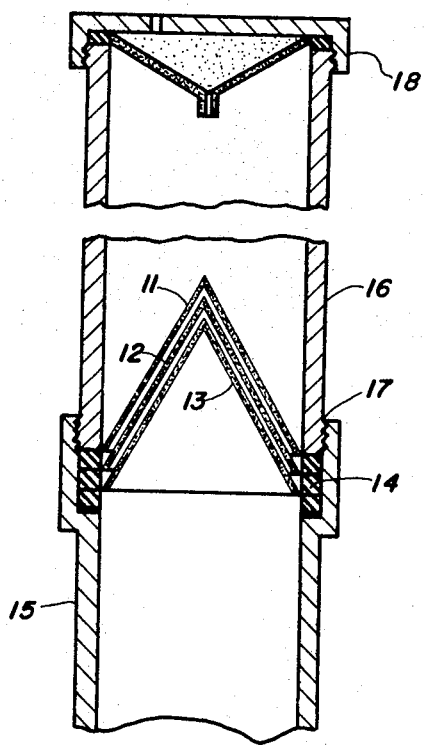

Reference is now made to FIG. 2 of the drawing, where a filter assembly is provided which is the conduit leading into a gasoline tank. The filter assembly consists of conical filter 11 having the greatest porosity, conical filter 12 having the intermediate porosity, and conical filter 13 having the finest porosity, all mounted between gaskets 14 to space them from one another and provide a liquid-tight seal between the lower conduit 15 and the neck 16 of the conduit, which are inserted one into the other as shown at 17 until the gaskets and flanges of the three filters compress tightly enough to prevent liquid leakage. The upper portion of neck 16 is closed by a filler cap 18 screwed thereon.

FIG. 2 serves to schematically show one filter assembly using the filter of this invention for gasoline and other petroleum products. Any solid particles of a coarse nature would first be trapped by filter 11 and the finer particles that pass through filter 11 would be trapped by filters 12 and 13.

Of course, any desired porosity can be provided as the invention is easily adapted to mass produce filters of many configurations and many porosities at both a low cost for the tooling and a low cost for the finished product and although it is primarily applicable to gasoline tanks as well as other petroleum installations, it can be used in many other similar fields where a filter of the nature of the present invention is desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A filter element having a porous layer of textile material with a fibrous structure of the class consisting of co-extruded, mechanically blended and matrix multi-component fibers formed from different polymeric materials, said fibers being self-bonded at their points of intersection.

2. An article as defined in claim 1 wherein said different polymeric materials are selected from the group consisting of polyolefins, polyamides, polyesters, polysulfones, polyphenylene oxides and polycarbonates.

3. An article as defined in claim 2 wherein said fibrous material is comprised of co-extruded fibers.

4. An article as defined in claim 3 wherein said polymeric materials are extruded in a sheath-core relationship, the sheath component being of said lower melting material.

5. An article as defined in claim 2 wherein one polymeric material is a polyamide and the other polymeric material is a polyester.

6. The filter of claim 1 wherein said fibrous structure is comprised of matrix filaments which are composed of a polycaproamide matrix and polyethylene terephthalate fibrils disposed in said matrix.

7. The filter of claim 1 wherein said porous layer is surrounded by a flange with a substantial portion of said layer inside said flange lying in a different plane from said flange such as a cone.

8. A filter of claim 7 mounted in a conduit for conveying petroleum products.

9. The method of making a filter by: taking multi-component fibers consisting of a first polymer having a melting point at least 10° C. lower than a second polymer, fabricating said filaments into a porous textile material, and forming said textile material into a filter by self-bonding said filaments to one another at their points of intersection by heating to a temperature above the fusion point of said first polymer and below the fusion point of said second polymer.

10. The process of claim 9 wherein a multiplicity of fibers are plied into a yarn which is then used for fabricating into a porous textile material, the diameter of said yarn being materially reduced by said heating step.

11. The process of claim 9 wherein the heating step is carried out between about 230° C. and 250° C.

12. The process of claim 11 wherein said forming step includes clamping a layer of said textile material about a periphery and pressing that portion inside the periphery into a three-dimensional shape.

13. The process of claim 12 wherein the textile material is free to retract thereby the interstices of said material are reduced from shrinkage of said material to form a microporous structure.

* * * * *

UNITED STATES PATENT OFFICE
CERTIFICATE OF CORRECTION

Patent No. 3,762,564      Dated October 2, 1973.

Inventor(s) G. C. Weedon, G. H. Collingwood and R. C. Wincllhofer

It is certified that error appears in the above-identified patent and that said Letters Patent are hereby corrected as shown below:

Column 3, line 10, after "antioxidants" delete "oxidants".

Column 3, line 42, "polymer" should be --polymeric--.

Column 4, line 66, "armoatic" should be --aromatic--.

Column 8, line 5, "werw" should be --were--.

Column 9, line 35, "This" should be --The--.

Column 9, line 48, "filters" should be --fibers--.

Table I, under "Time, sec." column, insert the following:
-- 60
60
60
60
15
15
15
15
60
60
60
15
15
15 --.

Column 10, line 38, "conrol" should be --control--.

Signed and sealed this 12th day of March 1974.

(SEAL)
Attest:

EDWARD M. FLETCHER, JR.　　　　　C. MARSHALL DANN
Attesting Officer　　　　　　　　　Commissioner of Patents